United States Patent
Liu et al.

(10) Patent No.: US 11,705,556 B2
(45) Date of Patent: Jul. 18, 2023

(54) POSITIVE ELECTRODE CURRENT COLLECTOR AND POSITIVE ELECTRODE PLATE, BATTERY, BATTERY MODULE, BATTERY PACK, AND APPARATUS CONTAINING SUCH POSITIVE ELECTRODE CURRENT COLLECTOR

(71) Applicant: CONTEMPORARY AMPEREX TECHNOLOGY CO., LIMITED, Ningde (CN)

(72) Inventors: Xin Liu, Ningde (CN); Qisen Huang, Ningde (CN); Mingling Li, Ningde (CN); Xianghui Liu, Ningde (CN); Cheng Li, Ningde (CN); Jia Peng, Ningde (CN); Chengdu Liang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/056,248

(22) Filed: Nov. 16, 2022

(65) Prior Publication Data
US 2023/0083168 A1    Mar. 16, 2023

Related U.S. Application Data

(63) Continuation of application No. PCT/CN2020/112691, filed on Aug. 31, 2020.

(51) Int. Cl.
*H01M 4/66* (2006.01)
*H01M 4/04* (2006.01)
(Continued)

(52) U.S. Cl.
CPC .......... *H01M 4/667* (2013.01); *H01M 4/0404* (2013.01); *H01M 50/46* (2021.01); *H01M 2004/028* (2013.01)

(58) Field of Classification Search
None
See application file for complete search history.

(56) References Cited

FOREIGN PATENT DOCUMENTS

| CN | 103633333 A | 3/2014 |
| CN | 105870457 A | 8/2016 |

(Continued)

OTHER PUBLICATIONS

International Search Report and Written Opinion received in PCT Application PCT/CN2020/112691 dated Jun. 7, 2021.

*Primary Examiner* — Tracy M Dove
(74) *Attorney, Agent, or Firm* — Kilpatrick Townsend & Stockton LLP (57) ABSTRACT

A positive electrode current collector and a positive electrode plate, a battery, a battery module, a battery pack, and an apparatus including the positive electrode current collector are provided. In some embodiments, a positive electrode current collector is provided, including an organic support layer and an aluminum-based conductive layer disposed on at least one surface of the organic support layer, where the aluminum-based conductive layer contains Al and at least one modifying element selected from O, N, F, B, S, and P, an XPS spectrogram of the aluminum-based conductive layer with a surface passivation layer removed through etching has at least a first peak falling in a range of 70 eV to 73.5 eV and a second peak falling in a range of 73.5 eV to 78 eV, and a ratio x of peak intensity of the second peak to that of the first peak satisfies $0 < x \leq 3.0$.

14 Claims, 6 Drawing Sheets

(51) Int. Cl.
*H01M 50/46* (2021.01)
*H01M 4/02* (2006.01)

(56) References Cited

FOREIGN PATENT DOCUMENTS

| | | |
|---|---|---|
| CN | 109346724 A | 2/2019 |
| CN | 110660957 A | 1/2020 |
| CN | 111180736 A | 5/2020 |
| KR | 101988158 B1 | 6/2019 |

POSITIVE ELECTRODE CURRENT COLLECTOR AND POSITIVE ELECTRODE PLATE, BATTERY, BATTERY MODULE, BATTERY PACK, AND APPARATUS CONTAINING SUCH POSITIVE ELECTRODE CURRENT COLLECTOR

CROSS-REFERENCE TO RELATED APPLICATIONS

This application is a continuation of International Application PCT/CN2020/112691, filed Aug. 31, 2020 and entitled "POSITIVE ELECTRODE CURRENT COLLECTOR AND POSITIVE ELECTRODE PLATE, BATTERY, BATTERY MODULE, BATTERY PACK, AND APPARATUS CONTAINING SUCH POSITIVE ELECTRODE CURRENT COLLECTOR", which is incorporated herein by reference in its entirety.

TECHNICAL FIELD

This disclosure relates to the field of energy storage, and specifically, to a current collector and disclosures of the current collector in an electrode plate, a battery, a battery module, a battery pack, and an apparatus.

BACKGROUND

Lithium-ion batteries are widely applied to electromobiles and consumer electronic products due to their advantages such as high energy density, high output power, long cycle life, and little environmental pollution. However, lithium precipitation is likely to occur when the lithium-ion batteries work under high power, which can easily lead to internal short circuit. In addition, the internal short circuit is also likely to occur in abnormal situations where the lithium-ion batteries are squeezed, collided, or penetrated. Therefore, a safety problem with the lithium-ion batteries has limited disclosure and popularization of the lithium-ion batteries to a great extent.

Results of a large number of tests show that the internal short circuit of the batteries are a root cause of safety hazards of the lithium-ion batteries. To avoid occurrence of internal short circuit of the batteries, researchers have tried to improve structures of separators, mechanical structures of the batteries, and the like. However, various designs in the prior art are still unable to effectively improve the lithium precipitation occurring when the batteries work under high power, avoid the occurrence of the internal short circuit of the lithium-ion batteries, or ensure that the batteries can still work after occurrence of an abnormal situation in which the lithium-ion batteries are squeezed, collided, or penetrated.

Therefore, a new battery design solution is required to resolve the above problem.

SUMMARY

In view of technical problems existing in the prior art, an objective of this disclosure is to provide a current collector and an electrode plate capable of improving safety of a battery.

A further objective of this disclosure is to provide a battery capable of preventing thermal runaway and maintaining battery safety under abnormal stresses such as collision, squeeze, penetration, and drop.

To achieve the foregoing invention objectives, a first aspect of this disclosure provides a positive electrode current collector, including an organic support layer and an aluminum-based conductive layer disposed on at least one surface of the organic support layer, where the aluminum-based conductive layer contains aluminum (Al) and at least one modifying element selected from oxygen (O), nitrogen (N), fluorine (F), boron (B), sulfur (S), and phosphorus (P), an X-ray photoelectron spectroscopy (XPS) spectrogram of the aluminum-based conductive layer with a surface passivation layer removed through etching has at least a first peak falling in a range of 70 eV to 73.5 eV and a second peak falling in a range of 73.5 eV to 78 eV, and a ratio x of peak intensity of the second peak to that of the first peak satisfies $0 < x \leq 3.0$.

Based on the current collector in this disclosure, due to the foregoing characteristics of the aluminum-based conductive layer, when the current collector with a composite structure is subjected to abnormal stresses such as collision, squeeze, and penetration, the aluminum-based conductive layer of a relatively thin thickness is prone to rapid cracking or even pulverization at a stress site, and as a result, a local abnormal stress point of the current collector with the composite structure quickly loses electrical conductivity. Therefore, when the current collector is used in the battery, a possibility of thermal runaway caused by short circuit occurring when a battery cell is subjected to abnormal mechanical damage such as penetration, squeeze, and drop can be greatly reduced, which improves a response speed to thermal runaway and significantly reduces short-circuit temperature rise of the battery cell after mechanical damage, thereby greatly improving the safety performance of the battery.

In any one of the foregoing embodiments of this disclosure, the ratio x of the peak intensity of the second peak to that of the first peak satisfies $0.1 \leq x \leq 1.5$.

In any one of the foregoing embodiments of this disclosure, a peak position of the first peak is in a range of 72.9 eV±0.6 eV, 72.9 eV±0.5 eV, 72.9 eV±0.4 eV, 72.9 eV±0.3 eV, 72.9 eV±0.2 eV, or 72.9 eV±0.1 eV.

In any one of the foregoing embodiments of this disclosure, a peak position of the second peak is in a range of 74.4 eV±0.6 eV, 74.4 eV±0.5 eV, 74.4 eV±0.4 eV, 74.4 eV±0.3 eV, 74.4 eV±0.2 eV, or 74.4 eV±0.1 eV.

In any one of the foregoing embodiments of this disclosure, a thickness of the aluminum-based conductive layer is D1, and D1 satisfies $0.1\ \mu m \leq D1 \leq 5\ \mu m$, and In some embodiments, $0.5\ \mu m \leq D1 \leq 2\ \mu m$. A conductive layer of such thickness has moderate resistance, is easy to process, and helps improve the energy density of the battery.

In any one of the foregoing embodiments of this disclosure, an etching depth h of the aluminum-based conductive layer and the thickness D1 of the aluminum-based conductive layer satisfy $0.1 \times D1 \leq h \leq 0.5 \times D1$, and In some embodiments, $0.3 \times D1 \leq h \leq 0.5 \times D1$. Such etching depth helps obtain an accurate XPS spectrogram of the conductive layer.

In any one of the foregoing embodiments of this disclosure, the modifying element in the aluminum-based conductive layer is selected from oxygen (O), nitrogen (N), and fluorine (F), and In some embodiments, is oxygen (O). These modifying elements help improve the brittleness of the conductive layer. When the battery is penetrated by an external foreign object, "point break" can be quickly formed at a local contact region between the current collector and the foreign object, and therefore, a possibility of thermal runaway caused by short circuit occurring when the battery cell is subjected to abnormal mechanical damage such as penetration, squeeze, and drop can be greatly reduced, which improves a response speed to thermal runaway, thereby greatly improving the safety performance of the battery.

In any one of the foregoing embodiments of this disclosure, an organic support layer material is selected from at least one of polyurethane, polyamide, polyterephthalate, polyimide, polyethylene, polypropylene, polystyrene, polyvinyl chloride, acrylonitrile-butadiene-styrene copolymer, polybutylene terephthalate, poly(p-phenylene terephthalamide), poly(p-phenylene ether), polyoxymethylene, epoxy resin, phenolic resin, polytetrafluoroethylene, polyvinylidene fluoride, silicone rubber, polycarbonate, and polyphenylene sulfide.

In any one of the foregoing embodiments of this disclosure, penetration displacement of the organic support layer material is less than or equal to 5 mm, In some embodiments, the penetration displacement of the organic support layer material is less than or equal to 4.7 mm, and further In some embodiments, the penetration displacement of the organic support layer material is less than or equal to 4 mm. In this disclosure, when the penetration displacement of the support layer material is lower, deformation of the current collector, a corresponding electrode plate, and the battery under mechanical damage is also smaller, a probability of thermal runaway caused by the short circuit of the battery is also lower, so that the battery is safer.

In any one of the foregoing embodiments of this disclosure, an X-ray photoelectron spectroscopy (XPS) spectrogram of a surface of the aluminum-based conductive layer has at least a third peak falling in a range of 70 eV to 73.5 eV and a fourth peak falling in a range of 73.5 eV to 78 eV, and a ratio y of peak intensity of the fourth peak to that of the third peak satisfies $1.5<y\leq4.0$. In this way, mechanical strength of the conductive layer can be further improved, and durability and electrochemical stability of the current collector with the composite structure can be significantly improved.

A second aspect of this disclosure further relates to a positive electrode plate, including the current collector according to a first aspect of this disclosure and an electrode active material layer formed on a surface of the current collector.

A third aspect of this disclosure further relates to a battery, including a positive electrode plate, a separator, and a negative electrode plate, where the positive electrode plate is the positive electrode plate according to the second aspect of this disclosure.

A fourth aspect of this disclosure further relates to a battery module, including the battery according to the third aspect of this disclosure.

A fifth aspect of this disclosure further relates to a battery pack, including the battery according to the third aspect of this disclosure or the battery module according to the fourth aspect of this disclosure.

A sixth aspect of this disclosure provides an apparatus, including at least one of the battery according to the third aspect of this disclosure, the battery module according to the fourth aspect of this disclosure, or the battery pack according to the fifth aspect of this disclosure.

Because the conductive layer of the positive electrode current collector in this disclosure is prone to rapid cracking or pulverization at the stress site in the abnormal stresses such as collision, squeeze, penetration, and drop, the local abnormal stress point of the current collector with the composite structure quickly loses electrical conductivity and "point break" is formed shortly. Therefore, the possibility of thermal runaway of the battery using the current collector can be reduced, which improves the response speed to thermal runaway. Therefore, the electrode plate, the battery, and the apparatus in this disclosure have improved safety performance.

IN THE DRAWINGS

1— positive electrode plate;
10— positive electrode current collector;
101— positive electrode organic support layer;
102— positive electrode conductive layer;
11— positive electrode active material layer;
2— negative electrode plate;
21— negative electrode current collector;
22— negative electrode active material layer;
3— separator;
4— nail;
5— battery;
51— housing;
52— electrode assembly; and
53—cover plate.

DESCRIPTION OF EMBODIMENTS

The following further describes this disclosure with reference to specific embodiments. It should be understood that these embodiments are merely used to describe this disclosure but not to limit the scope of this disclosure.

For brevity, the present disclosure provides some numerical ranges. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, each individually disclosed point or single numerical value, as a lower limit or an upper limit, may be combined with any other point or single numerical value or combined with another lower limit or upper limit to form an unspecified range.

In the descriptions of this specification, it should be noted that "more than" or "less than" is inclusive of the present number and that "more" in "one or more" means two or more than two, unless otherwise specified.

Unless otherwise specified, terms used in this disclosure have well-known meanings generally understood by persons skilled in the art. Unless otherwise specified, numerical values of parameters mentioned in this disclosure may be measured by using various measurement methods commonly used in the art (for example, testing may be performed by using a method provided in the embodiments of this disclosure).

I. Positive Electrode Current Collector

A first aspect of this disclosure provides a positive electrode current collector, including an organic support layer and an aluminum-based conductive layer disposed on at least one surface of the organic support layer, where the aluminum-based conductive layer contains aluminum (Al) and at least one modifying element selected from oxygen (O), nitrogen (N), fluorine (F), boron (B), sulfur (S), and phosphorus (P), an X-ray photoelectron spectroscopy (XPS) spectrogram of the aluminum-based conductive layer with a surface passivation layer removed through etching has at least a first peak falling in a range of 70 eV to 73.5 eV and a second peak falling in a range of 73.5 eV to 78 eV, and a ratio x of peak intensity of the second peak to that of the first peak satisfies $0<x\leq3.0$.

In the prior art, some studies are to improve safety performance of lithium-ion batteries in terms of improving a design of a current collector. Herein, a multi-layer current collector with two metal layers and a resin layer sandwiched between the two metal layers is used, so that as the temperature of the battery increases to a melting point of the resin layer, the resin layer of the current collector melts to damage the electrode plate and cut off current, thereby improving the safety performance of the battery.

However, in many cases, only melting the resin layer to damage the electrode plate is not sufficiently reliable. The inventors have found through careful research that a conductive layer of a composite current collector in the prior art can be further improved and that some special designs can be made to crack and damage the conductive layer of the composite current collector in an extreme case to further block the current. In this way, in the extreme case, the conductive layer of the current collector is cracked and damaged to block the current, the support layer is heated to melt to further cut off the current, and the two together can greatly improve safety of the electrode plate and the battery.

The inventors have found that when a regular aluminum conductive layer of the composite current collector is doped with some specific elements and is subjected to specific treatment, a new material structure can be formed in the conductive layer in some cases, thereby further improving the safety of the electrode plate and the battery. Without being bound by a specific theory, the inventors believe that when an aluminum body of the conductive layer is doped with a specific type of modifying element and is subjected to a specific treatment, an aluminum alloy or aluminide having a specific ceramic feature can be formed inside the conductive layer. This aluminum alloy or aluminide has the brittleness of ceramics. In a case that the battery is impacted, squeezed, penetrated, dropped, and the like, the current collector with the composite structure is subjected to a large external force, the organic support layer inside the composite current collector can be broken, cracked, or pulverized quickly under action of a conductive layer with a brittle surface, so that a contact region between the current collector and a foreign object loses electrical conductivity and "point break" is quickly formed. Therefore, when the foregoing current collector with the composite structure is used in the battery, a possibility of thermal runaway caused by short circuit occurring when the battery is subjected to abnormal mechanical damage such as penetration, squeeze, and drop can be greatly reduced, which improves a response speed in inhibiting thermal runaway of the battery, thereby greatly improving the safety performance of the battery.

In some embodiments, the modifying element may be at least one element selected from oxygen (O), nitrogen (N), fluorine (F), boron (B), sulfur (S), and phosphorus (P), and In some embodiments, is at least one element selected from F, O, and N, and further In some embodiments, is O.

It is difficult to directly observe formation of the aluminum alloy or aluminide of a ceramic nature in the aluminum body, and it is difficult to quantify such formation due to various complex factors such as a type of the modifying element, a doping amount, a processing method, and a condition. The inventors of this disclosure have an unexpected finding that by applying X-ray photoelectron spectroscopy (XPS) to the body of the conductive layer, it can be easily determined whether the aluminum alloy or aluminide of a ceramic nature exists. Specifically, the X-ray photoelectron spectroscopy (XPS) spectrogram of the conductive layer obtained with a surface passivation layer removed through etching has at least a first peak falling in a range of 70 eV to 73.5 eV and a second peak falling in a range of 73.5 eV to 78 eV, and the ratio x of peak intensity of the second peak to that of the first peak satisfies $0<x\leq3.0$. When x=0, the conductive layer is a pure aluminum layer, has good extensibility, and still has a specific conductive characteristic in the event of mechanical damage. Therefore, when the conductive layer is used to improve safety performance of the battery in the event of the mechanical damage, an improvement effect is not stable, especially in a large-capacity battery cell. However, when x>3.0, electrical conductivity of the aluminum-based conductive layer is greatly reduced, which affects a capability of the aluminum-based conductive layer for collecting the current and leads to a battery using the aluminum-based conductive layer to have a large internal resistance, a low discharge capacity, and a sharp drop in electrical performance such as cycling and rate performance.

In some embodiments, $0.1\leq x\leq1.5$; and in some other embodiments, $1.5<x\leq3.0$. A minimum value of the ratio x can alternatively be 0.1, 0.2, 0.3, 0.4, 0.5, 0.8, 1.0, 1.2, 1.3, 1.4, or 1.5; and a maximum value of the ratio x can alternatively be 2.8, 2.5, 2.2, 2.0, 1.5, 1.4, 1.3, 1.2, 1.1, or 1.0.

To obtain the XPS spectrogram of the body of the conductive layer, the passivation layer on the surface of the conductive layer needs to be removed before the XPS spectrogram measurement. This is because metal aluminum is oxidized when exposed to air and forms an oxide passivation layer on a surface. Direct XPS measurement of the conductive layer without surface treatment interferes with a measurement result. For accuracy of the measurement, the conductive layer can usually be etched to remove 10% to 50% of a total thickness of the conductive layer, and In some embodiments, 30% to 50% of the total thickness of the conductive layer. That is, in some embodiments, an etching depth h of the aluminum-based conductive layer and the thickness D1 of the aluminum-based conductive layer satisfy $0.1 \times D1 \leq h \leq 0.5 \times D1$, and In some embodiments, $0.3 \times D1 \leq h \leq 0.5 \times D1$.

In this disclosure, the current collector with the composite structure can be etched by using a conventional etcher. For example, the surface of the current collector can be etched by using an Ar ion etcher at 1-10 kV (for example, 3 kV) for 5-60 minutes (for example, 15 minutes). A specific measurement condition for the XPS spectrogram measurement can be easily determined by a person skilled in the art, and a conventional test condition (for example, at a test temperature of 25° C.) usually used for measuring a metal sample can be used. A person skilled in the art understands that, in the XPS spectrogram, "peak intensity" of a specific peak refers to a height of the peak in the XPS spectrogram.

It is well known to a person skilled in the art that because of a difference in measurement conditions and an operation error, there may be a specific error in the peak position in the XPS spectrogram. Depending on the specific measurement condition, the peak (the first peak) in the range of 70 eV to 73.5 eV may occur in the range of 72.9 eV±0.6 eV, 72.9 eV±0.5 eV, 72.9 eV±0.4 eV, 72.9 eV±0.3 eV, 72.9 eV±0.2 eV, or 72.9 eV±0.1 eV. Depending on the specific measurement condition, the peak (the second peak) in the range of 73.5 eV to 78 eV may occur in the range of 74.4 eV±0.6 eV, 74.4 eV±0.5 eV, 74.4 eV±0.4 eV, 74.4 eV±0.3 eV, 74.4 eV±0.2 eV, or 74.4 eV±0.1 eV.

After further study, the inventors of this disclosure believe that the first peak near 72.9 eV is a peak representing elemental aluminum)($Al^0$, and the second peak near 74.4 eV is a peak representing a compound of aluminum ($Al^{3+}$), which can indicate existence of an aluminide formed of aluminum and another modifying element. Therefore, the ratio x of the peak intensity of the second peak to that of the first peak can indicate relative amounts of the element aluminum of two valencies (however, x is not simply proportional to the relative amounts of aluminum of the two valencies, and also depends on other factors). However, this disclosure is not limited to such theoretical interpretation.

Figure 1:
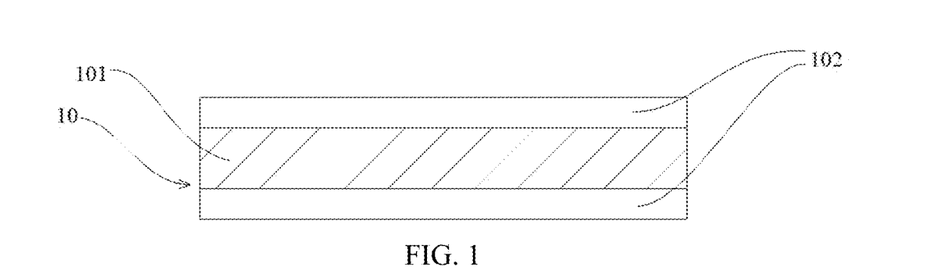
FIG. 1 is a schematic structural diagram of a positive electrode current collector according to a specific embodiment of this disclosure.
Figure 2:
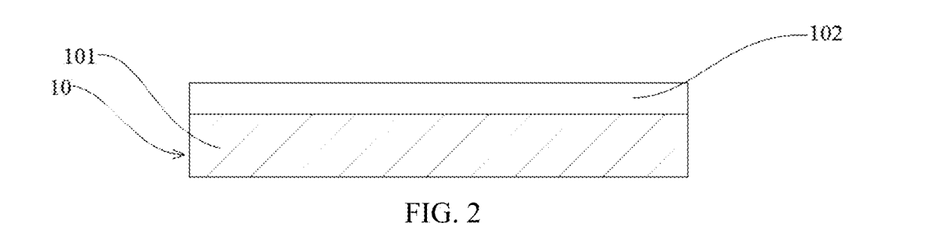
FIG. 2 is a schematic structural diagram of a positive electrode current collector according to another specific embodiment of this disclosure.

FIG. 1 and FIG. 2 are schematic structural diagrams of a positive electrode current collector according to some embodiments of this disclosure. FIG. 1 is a schematic structural diagram of a positive electrode current collector 10 according to an embodiment of this disclosure. Referring to FIG. 1, the composite current collector 10 includes a stacked organic support layer 101 and two conductive layers 102 respectively located on two surfaces of the organic support layer 101. The organic support layer is configured to hold the conductive layer, and supports and protects the conductive layer. The conductive layer is configured to hold an electrode active material layer, and provide electrons for the electrode active material layer, that is, the conductive layer has functions of conduction and current collection.

It can be understood that, the conductive layer 102 may, in some embodiments, be disposed on one surface of the organic support layer 101. For example, FIG. 2 is a schematic structural diagram of a positive electrode composite current collector 10 according to another embodiment of this disclosure. Referring to FIG. 2, the composite current collector 10 includes a stacked organic support layer 101 and one conductive layer 102 located on one surface of the organic support layer 101.

A person skilled in the art understands that the composite current collector 10 in this disclosure may also optionally include another structural layer. For example, a protection layer (which may be, for example, a metal oxide) may be additionally disposed on the conductive layer to protect the conductive layer from chemical corrosion or mechanical damage, and to ensure working stability and service life of the composite current collector 10.

[Support Layer of Current Collector]

In the current collector in this embodiment of this disclosure, the support layer has functions of supporting and protecting the conductive layer. Because the support layer generally uses an organic polymer material or a polymer composite material, density of the support layer is usually lower than density of the conductive layer, which can significantly increase the weight energy density of the battery compared with a conventional metal current collector.

In addition, the metal layer having a smaller thickness is used, which can further increase the weight energy density of the battery. In addition, because the support layer can well support and protect the conductive layer on a surface of the support layer, common fracture of an electrode plate in the conventional current collector is not likely to occur.

In some embodiments, the material of the support layer may be selected from at least one of an insulating polymer material, an insulating polymer composite material, a conductive polymer material, and a conductive polymer composite material.

The insulating polymer material is, for example, selected from at least one of polyurethane, polyamide, polyterephthalate, polyimide, polyethylene, polypropylene, polystyrene, polyvinyl chloride, acrylonitrile-butadiene-styrene copolymer, polybutylene terephthalate, poly(p-phenylene terephthalamide), poly(p-phenylene ether), polyoxymethylene, epoxy resin, phenolic resin, polytetrafluoroethylene, polyvinylidene fluoride, silicone rubber, polycarbonate, and polyphenylene sulfide.

The insulating polymer composite material is, for example, selected from a composite material formed of an insulating polymer material and an inorganic material, where the inorganic material is preferably at least one of a ceramic material, a glass material, and a ceramic composite material.

The conductive polymer material is, for example, selected from a polysulfur nitride polymer material or a doped conjugated polymer material, such as at least one of polypyrrole, polyacetylene, polyaniline, and polythiophene.

The conductive polymer composite material is, for example, selected from a composite material formed of an insulating polymer material and a conductive material, where the conductive material is selected from at least one of a conductive carbon material, a metal material, and a composite conductive material, the conductive carbon material is selected from at least one of carbon black, carbon nanotube, graphite, acetylene black, and graphene, the metal material is selected from at least one of nickel, iron, copper, aluminum or alloy of the foregoing metal, and the composite conductive material is selected from at least one of nickel-coated graphite powder and nickel-coated carbon fiber.

A person skilled in the art can select and determine the material of the support layer based on factors such as an actual need of an disclosure situation and a cost. In this disclosure, the material of the support layer is preferably an insulating polymer material or an insulating polymer composite material.

A thickness of the organic support layer is D2, and D2 optionally satisfies 1 μm≤D2≤30 μm, further In some embodiments, 1 µm≤D2≤20 µm, or still further In some embodiments, 1 µm≤D2≤15 µm.

If the support layer is excessively thin, the mechanical strength of the support layer is insufficient, and breakage easily occurs during a process such as the electrode plate machining process; or if the support layer is excessively thick, volumetric energy density of the battery using the current collector is reduced. In addition, the specified thickness in this disclosure can further ensure that the current collector has great resistance, and significantly reduce a battery temperature increase when short circuit occurs in the battery.

In some embodiments, penetration displacement of the organic support layer material is less than or equal to 5 mm, In some embodiments, the penetration displacement of the organic support layer material is less than or equal to 4.7 mm, and further In some embodiments, the penetration displacement of the organic support layer material is less than or equal to 4 mm. When the penetration displacement of the support layer material is lower, deformation of the current collector, a corresponding electrode plate, and the battery under mechanical damage is also smaller, a probability of thermal runaway caused by the short circuit of the battery is also lower, so that the battery is safer.

[Conductive Layer of Current Collector]

Compared with a conventional metal current collector, in the current collector in this embodiment of this disclosure, the conductive layer has a conduction function and a current collection function, and is configured to provide electrons for the electrode active material layer. Compared with a conventional metal current collector, a thickness of the conductive layer is significantly reduced and density of the organic support layer is less than density of metal. This helps reduce weight of a battery cell and the lithium-ion battery and improve energy density of the lithium-ion battery when it is ensured that the conductive layer has good conduction and current collection performance.

In the current collector in this disclosure, the conductive layer is an aluminum-based conductive layer, that is, a body material of the conductive layer is aluminum or an aluminum alloy. The aluminum alloy used herein may be a conductive alloy formed of aluminum and at least one metal element selected from copper, nickel, iron, titanium, silver, and zirconium.

In the current collector in this disclosure, in addition to aluminum (Al) (and In some embodiments, another metal element), the aluminum-based conductive layer further includes at least one modifying element to form an aluminide of a ceramic nature. The modifying element may be at least one element selected from oxygen (O), nitrogen (N), fluorine (F), boron (B), sulfur (S), and phosphorus (P), and In some embodiments, the modifying element is at least one element selected from F, O, and N, and further In some embodiments, is O. The modifying element can be integrated into the aluminum-based conductive layer through conventional doping or another method.

In the current collector in this disclosure, with respect to a total mass of the conductive layer, a weight percentage of the element aluminum in the aluminum-based conductive layer is 90 wt % or more, and In some embodiments, 95 wt % or more, and further In some embodiments, 98 wt % or more.

In the current collector in this disclosure, with respect to a total mass of the conductive layer, a weight percentage of modifying element in the aluminum-based conductive layer is 5 wt % or less, and In some embodiments, 3 wt % or less, and further In some embodiments, 1 wt % or less.

In accordance with this disclosure, a thickness of the aluminum-based conductive layer is D1, and D1 usually satisfies 0.1 µm≤D1≤5 µm. In an improvement of the current collector in this disclosure, D1 satisfies 1 µm≤D1≤3 µm, and In some embodiments, D1 satisfies 0.5 µm≤D1≤2 µm.

The aluminum-based conductive layer mainly has a function of conducting the current. If the conductive layer is excessively thin, the current collector has a weak current conduction capability and large resistance, is prone to fuse when a large current flows through, and is prone to break down during a normal machining process of the electrode plate, which reduces a yield rate; or if the conductive layer is excessively thick, the volumetric energy density of the battery using the current collector is reduced.

For the positive electrode current collector in this disclosure, the aluminum-based conductive layer may be formed on the organic support layer through at least one of mechanical roll-in, bonding, vapor deposition (vapor deposition), electroless plating (Electroless plating), and electroplating. The vapor deposition method is preferably physical vapor deposition (PVD). The physical vapor deposition method is preferably at least one of an evaporating method and a sputtering method. The evaporating method is preferably at least one of vacuum evaporating (vacuum evaporating), thermal evaporation deposition (Thermal Evaporation Deposition), and electron beam evaporation method (EBEM). The sputtering method is preferably magnetron sputtering (Magnetron sputtering). For example, an organic support layer of specific specifications may be selected, and an aluminum-based conductive layer of a specific thickness is formed on a surface of the organic support layer through vacuum evaporating, mechanical roll-in, or bonding. An XPS test is conducted for the aluminum-based conductive layers to confirm compliance with a requirement of this disclosure In some embodiments, at least one of vapor deposition, electroplating, or electroless plating is used, so that the support layer and the conductive layer are more firmly bonded.

In an example, a typical process condition for forming the conductive layer through mechanical roll-in described above is as follows: The aluminum-based foil is placed in a mechanical roller and rolling compacted to a predetermined thickness by applying pressure of 20 t to 40 t, and then placed onto the surface of the organic support layer subjected to surface cleaning treatment; and finally, the aluminum-based foil and the organic support layer are placed in the mechanical roller to be tightly bonded by applying pressure of 30 t to 50 t. A value range of x in the aluminum-based conductive layer is controlled by introducing corresponding gas (for example, $O_2$, $N_2$, and $F_2$) for reaction during a forming process of the aluminum-based foil.

In an example, a typical process condition for forming the conductive layer through vacuum evaporating is as follows: An organic support layer subjected to the surface cleaning treatment is placed into a vacuum evaporating chamber, high-purity aluminum wires in a metal evaporating chamber are melted and evaporated at a high temperature of 800° C. to 2000° C., a specific flow of gas (for example, $O_2$, $N_2$, and $F_2$) is also injected into a pinhole cavity, evaporated Al goes through a cooling system in the vacuum evaporating chamber, and some Al atoms also react with the gas to form an aluminum-based compound, and are finally co-deposited on the surface of the organic support layer to form multiple aluminum-based conductive layers.

A typical process condition for forming the conductive layer through bonding is as follows: The aluminum-based foil is placed in a mechanical roller and rolling compacted to a predetermined thickness by applying pressure of 20 t to 40 t, and then the surface of the organic support layer subjected to surface cleaning treatment is coated with a mixed solution of PVDF and NMP; and finally, the aluminum-based conductive layer of the predetermined thickness is adhered to the surface of the organic support layer and dried at 100° C. A value range of x in the aluminum-based conductive layer is controlled by introducing corresponding gas (for example, $O_2$, $N_2$, and $F_2$) for reaction during a formation process of the aluminum-based foil.

[Protection Layer of Current Collector]

In accordance with this disclosure, a conductive layer of a current collector may further include a first protection layer, the first protection layer is located on a surface of the conductive layer (namely, an upper surface of the conductive layer) that faces away from an insulation layer, and the first protection layer contains element Al.

In a further optional embodiment of this disclosure, an X-ray photoelectron spectroscopy (XPS) spectrogram of a surface of the current collector has at least a third peak falling in a range of 70 eV to 73.5 eV and a fourth peak falling in a range of 73.5 eV to 78 eV, and a ratio y of peak intensity of the fourth peak to that of the third peak satisfies $1.5 < y \leq 4.0$. The applicants have found through research that when a value of y of the current collector with the composite structure including the first protection layer is within the foregoing range, a surface passivation layer of the current collector has stronger oxidation resistance and higher mechanical strength, and the first protection layer and the conductive layer are more firmly bonded, thereby further improving durability of the current collector during disclosure to a battery system.

It should be noted that the parameters (for example, a thickness and material composition) of the material layers provided in this disclosure all refer to parameters measured for a single-sided material layer. When there are two material layers, parameters of either material layer making true this disclosure shall be construed as falling within the protection scope of this disclosure.

II. Positive Electrode Plate

This disclosure further relates to a positive electrode plate, including the positive electrode current collector in this disclosure and an electrode active material layer formed on a surface of the positive electrode current collector.

Figure 3:
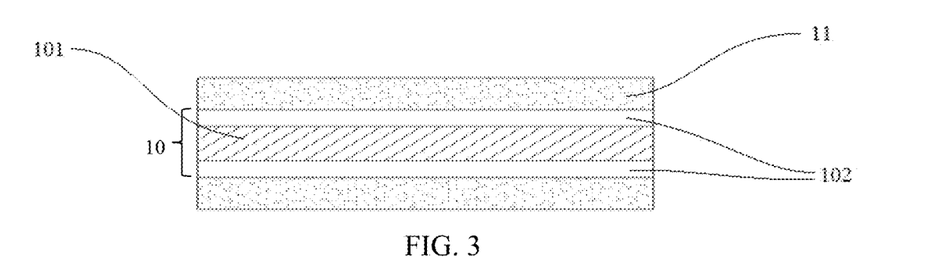
FIG. 3 is a schematic structural diagram of a positive electrode plate according to a specific embodiment of this disclosure.
Figure 4:
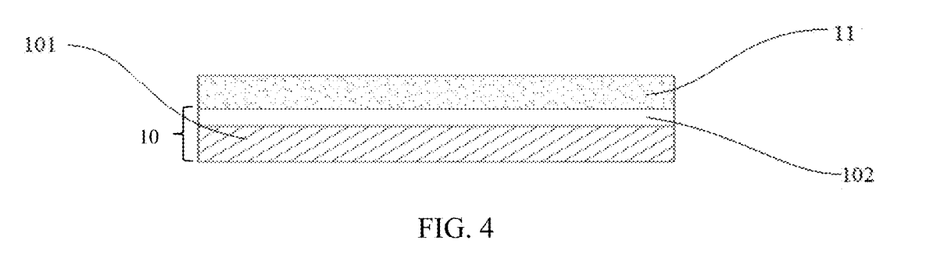
FIG. 4 is a schematic structural diagram of a positive electrode plate according to another specific embodiment of this disclosure.

FIG. 3 to FIG. 4 are schematic structural diagrams of positive electrode plates according to some embodiments of this disclosure. FIG. 3 is a schematic structural diagram of a positive electrode plate according to an embodiment of this disclosure. Referring to FIG. 1, the positive electrode plate includes a positive electrode current collector 10 and two positive electrode active material layers 11 respectively formed on two surfaces of the positive electrode current collector 10. The positive electrode current collector 10 includes a positive electrode organic support layer 101 and two aluminum-based conductive layers 102 on surfaces of the positive electrode organic support layer.

It can be understood that, when an aluminum-based conductive layer is provided on one surface of the organic support layer of the positive electrode current collector, only one surface of the current collector can be coated with an active substance. For example, FIG. 4 is a schematic structural diagram of a positive electrode plate according to another embodiment of this disclosure. Referring to FIG. 2, the positive electrode plate includes a positive electrode current collector 10 and a positive electrode active material layer 11 formed on one surface of the positive electrode current collector 10. The positive electrode current collector 10 includes a positive electrode organic support layer 101 and one aluminum-based conductive layer 102 on a surface of the positive electrode organic support layer 101. The positive electrode plate shown in FIG. 4 can be folded and applied to the battery.

The positive electrode plate is usually formed with a positive electrode active material layer slurry applied and dried. A positive electrode active material layer slurry is usually formed by dispersing a positive electrode active material and In some embodiments, a conductive agent, a binder, and the like in a solvent and stirring them well. The solvent may be, for example, N-methylpyrrolidone (NMP) or deionized water. Other optional adjuvants may be, for example, a thickening and dispersing agent (such as sodium carboxymethyl cellulose CMC-Na) and a PTC thermistor material.

In the battery in accordance with this disclosure, the positive electrode active material may be various positive electrode active materials generally used in the art. Using a positive electrode plate of a lithium-ion battery as an example, a positive electrode active material of the positive electrode plate may include one or more of a lithium transition metal oxide, lithium-containing phosphates with an olivine structure, and their respective modified compounds. Examples of the lithium transition metal oxide may include but are not limited to one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides, and modified compounds thereof. Examples of the lithium-containing phosphates with an olivine structure may include but are not limited to one or more of lithium iron phosphate, composite materials of lithium iron phosphate and carbon, lithium manganese phosphate, composite materials of lithium manganese phosphate and carbon, lithium manganese iron phosphate, composite materials of lithium manganese iron phosphate and carbon, and modified compounds thereof. This disclosure imposes no limitation on these materials, and other conventional well-known materials that can be used as the positive electrode active material for the battery can also be used.

In some optional embodiments, to further improve the energy density of the battery, the positive electrode active material may include one or more of the lithium transition metal oxides represented by formula 1 and modified compounds thereof:

$$Li_a Ni_b Co_c M_d O_e A_f \qquad \text{formula 1}$$

In the formula 1, $0.8 \leq a \leq 1.2$, $0.5 \leq b < 1$, $0 < c < 1$, $0 < d < 1$, $1 \leq e \leq 2$, and $0 \leq f \leq 1$, M is selected from one or more of Mn, Al, Zr, Zn, Cu, Cr, Mg, Fe, V, Ti, and B, and A is selected from one or more of N, F, S, and Cl.

In this disclosure, the modified compounds of the materials may be doping modification and/or surface coating modification of the materials.

The electrode active material layer of the positive electrode plate in this disclosure further optionally includes a binder and/or a conductive agent.

In an example, the binder used for the electrode active material layer may include one or more of polyvinylidene fluoride (PVDF) and polytetrafluoroethylene (PTFE).

In an example, the conductive agent used for the electrode active material layer may include one or more of superconducting carbon, acetylene black, carbon black, Ketjen black, carbon dots, carbon nanotubes, graphene, and carbon nanofibers.

III. Battery

This disclosure further relates to a battery, including a positive electrode plate, a separator, an electrolyte, and a negative electrode plate, where the positive electrode plate is the positive electrode plate according to the foregoing second aspect. The battery in this disclosure may be of a winding type or a laminated type. The battery in this disclosure may be one of a lithium-ion battery, a lithium primary battery, a sodium-ion battery, or a magnesium-ion battery, but is not limited thereto. During a charging and discharging process of the battery, active ions are intercalated and deintercalated back and forth between the positive electrode plate and the negative electrode plate, and the electrolyte has a function of conducting ions between the positive electrode plate and the negative electrode plate.

[Negative Electrode Plate]

The battery in this disclosure can use any negative electrode plate commonly used in the art. The negative electrode plate usually includes a negative electrode current collector and a negative electrode active material layer.

In the battery in this disclosure, the negative electrode current collector can use metal foil or a composite current collector (a metal material can be disposed on a polymer substrate to form a composite current collector). In an example, the negative electrode current collector may be copper foil.

In the battery in accordance with this disclosure, the negative electrode active material layer usually includes a negative electrode active material, an optional binder, an optional conductive agent, and other optional adjuvants, and is usually formed with a negative electrode active material layer slurry applied and dried. A negative electrode active material layer slurry is usually formed by dispersing the negative electrode active material, and In some embodiments, a conductive agent, a binder, and the like in a solvent and stirring them well. The solvent may be, for example, N-methylpyrrolidone (NMP) or deionized water. The other optional adjuvants may be, for example, a thickener and dispersant (such as sodium carboxymethyl cellulose CMC-Na), a PTC thermistor material, and the like.

In an example, the conductive agent may include one or more of superconducting carbon, acetylene black, carbon black, Ketjen black, carbon dots, carbon nanotubes, graphene, and carbon nanofibers.

In an example, the binder may include one or more of styrene-butadiene rubber (SBR), water-based acrylic resin (water-based acrylic resin), polyvinylidene fluoride (PVDF), polytetrafluoroethylene (PTFE), ethylene vinyl acetate (EVA), polyvinyl alcohol (PVA), and polyvinyl butyral (PVB).

In the battery in this disclosure, the negative electrode active material layer may be disposed on one surface of the negative electrode current collector, or may be disposed on both surfaces of the negative electrode current collector.

[Electrolyte]

The electrolyte has a function of conducting ions between the positive electrode plate and the negative electrode plate. This disclosure imposes no specific limitation on a type of the electrolyte, which can be selected as required. For example, the electrolyte may be selected from at least one of a solid electrolyte and a liquid electrolyte (or electrolyte solution).

In some embodiments, the electrolyte is an electrolyte solution. The electrolyte solution includes an electrolytic salt and a solvent.

In some embodiments, the electrolytic salt may be selected from one or more of lithium hexafluorophosphate ($LiPF_6$), lithium tetrafluoroborate($LiBF_4$), lithium perchlorate ($LiClO_4$), lithium hexafluoroarsenate ($LiAsF_6$), lithium bis(fluorosulfonyl)imide (LiFSI), lithium bistrifluoromethanesulfonimide (LiTFSI), lithium trifluoromethanesulfonate (LiTFS), lithium difluoro(oxalato)borate (LiDFOB), lithium bis(oxalato)borate (LiBOB), lithium difluorophosphate ($LiPO_2F_2$), lithium difluoro bis(oxalato)phosphate (LiDFOP), and lithium tetrafluoro oxalato phosphate (LiTFOP).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), 1,2-butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), methyl sulfone (MSM), ethyl methanesulfonate (EMS), and diethyl sulfone (ESE).

In some embodiments, the electrolyte solution may optionally include an additive. For example, the additive may include a negative electrode film forming additive, or may include a positive electrode film forming additive, or may include an additive capable of improving some performance of the battery, for example, an additive for improving over-charge performance of the battery, an additive for improving high-temperature performance of the battery, and an additive for improving low-temperature performance of the battery.

[Separator]

Batteries with liquid electrolyte and some batteries with solid electrolyte also include separators. The separator is disposed between the positive electrode plate and the negative electrode plate for isolation. This disclosure imposes no particular limitation on a type of the separator, which may be any well-known porous separator with good chemical stability and mechanical stability. In some embodiments, a material of the separator may be selected from one or more of a glass fiber, non-woven, polyethylene, polypropylene polyethylene, and polyvinylidene fluoride. The separator may be a single-layer thin film or a multi-layer composite thin film. When the separator is a multilayer composite film, each layer may be made of the same or different materials.

[Structure and Preparation Method of Battery]

A structure and a preparation method of the battery in this disclosure are well-known.

In some embodiments, a positive electrode plate, a separator, and a negative electrode plate are stacked in sequence, so that the separator is located between the positive and negative electrode plates for isolation, and then winding (or lamination) process is performed to obtain an electrode assembly. The electrode assembly is placed into an outer package and dried, and the electrolyte is injected. After vacuum packaging, standing, formation, shaping, and other processes, a battery is obtained.

In some embodiments, the outer package of the battery may be a hard shell, for example, a hard plastic shell, an aluminum shell, or a steel shell. The outer package of the battery may alternatively be a soft pack, for example, a soft pouch. A material of the soft pack may be plastic, for example, one or more of polypropylene (PP), polybutylene terephthalate (PBT), polybutylene succinate (PBS), and the like.

This disclosure imposes no particular limitation on a shape of the battery, which may be cylindrical, rectangular, or any other shape.

Figure 5:
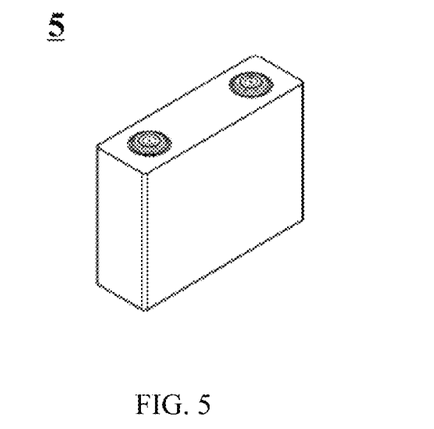
FIG. 5 is a schematic diagram of a battery according to a specific embodiment of this disclosure.
Figure 6:
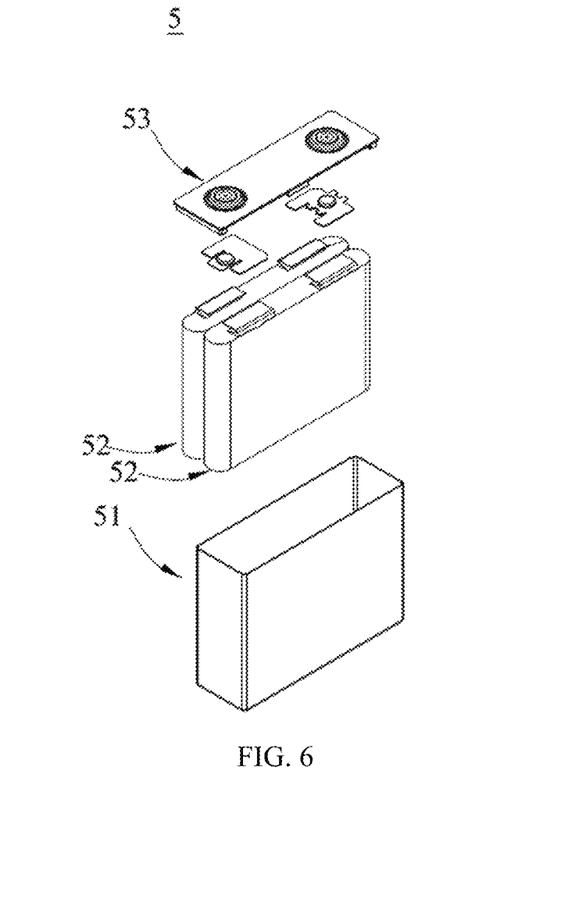
FIG. 6 is a schematic structural exploded view of the battery shown in FIG. 5.

FIG. 5 shows a rectangular battery 5 as an example. FIG. 6 is a schematic structural exploded view of a structure of the battery 5 in FIG. 5. Referring to FIG. 6, the outer package may include a housing 51 and a cover plate 53. The housing 51 may include a base plate and a side plate connected onto the base plate, and the base plate and the side plate enclose an accommodating cavity. The housing 51 has an opening connected to the accommodating cavity, and the cover plate 53 can cover the opening to seal the accommodating cavity. A positive electrode plate, a negative electrode plate, and a separator may be wound or laminated to form an electrode assembly 52. The electrode assembly 52 is packaged in the accommodating cavity. The electrolyte infiltrates the electrode assembly 52. There may be one or more electrode assemblies 52 in the battery 5, and the quantity may be adjusted as required.

In some embodiments, batteries may be assembled into a battery module, and the battery module may include a plurality of batteries. A specific quantity may be adjusted based on disclosure and a capacity of the battery module.

In some embodiments, the battery module may be further assembled into a battery pack, and a quantity of battery modules included in the battery pack may be adjusted based on disclosure and a capacity of the battery pack.

During use of the battery, abnormal situations that cause short circuit include impact, squeeze, penetration by a foreign object, and the like. Because short circuit is caused in these damage processes by materials with specific conductivity electrically connecting positive and negative electrodes, such abnormal situations are collectively referred to as nail penetration in this disclosure. In addition, in a specific embodiment of this disclosure, abnormal situations of a battery are simulated through a nail penetration test.

Figure 7:
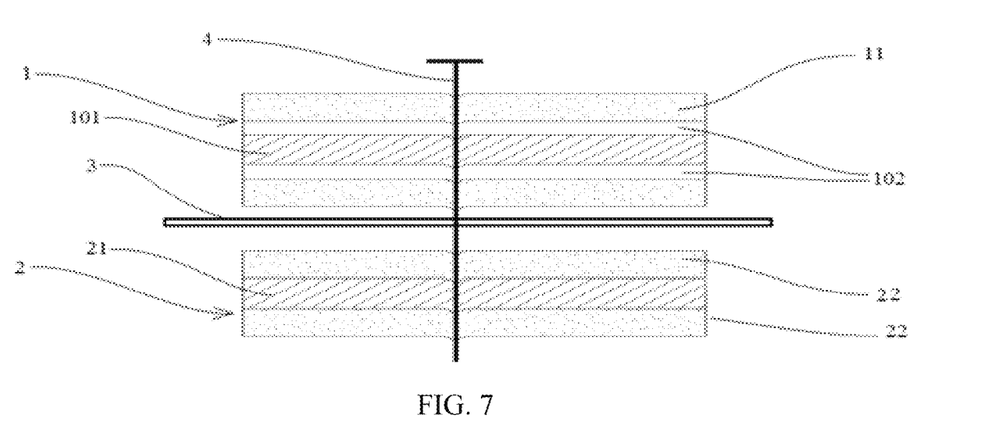
FIG. 7 is a schematic diagram of a nail penetration test used in this disclosure.

In this disclosure, the nail penetration test is used to simulate abnormal situations of the battery, for observing changes in the battery after nail penetration. FIG. 7 is a schematic diagram of one-time nail penetration test in this disclosure. For brevity, the figure only shows a nail 4 penetrating a one-layer positive electrode plate 1, a one-layer separator 3, and a one-layer negative electrode plate 2 of the battery. It should be noted that, in the actual nail penetration test, the nail 4 penetrates the whole battery, which usually includes a multi-layer positive electrode plate 1, a multi-layer separator 3, and a multi-layer negative electrode plate 2.

For a conventional lithium-ion battery including a conventional positive electrode plate and a conventional negative electrode plate, when internal short circuit occurs in an abnormal situation, basically all conventional lithium-ion batteries experience different levels of smoke, fire, explosion, and the like. However, the battery in this disclosure has a characteristic of confining impact of short-circuit damage on the battery to a "point" range in a short period of time without affecting normal use of the battery, which is referred to as "point break", thereby significantly improving safety of the battery in abnormal situations. Therefore, this disclosure also relates to the use of the positive electrode current collector in preparation of a battery that only forms point break to protect itself when experiencing an abnormal situation that causes the short circuit.

In addition, this disclosure also relates to the use of the positive electrode current collector as a current collector of a battery that only forms point break when experiencing an abnormal situation that causes the short circuit.

IV. Apparatus

A fourth aspect of this disclosure provides an apparatus. The apparatus includes at least one of the battery, the battery module, or the battery pack according to the third aspect of this disclosure. The battery, the battery module, or the battery pack may be used as a power source for the apparatus, or an energy storage unit of the apparatus. The apparatus in this disclosure uses the battery provided in this disclosure, and therefore has at least the same advantages as the battery.

The apparatus may be, but is not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A battery, a battery module, or a battery pack may be selected for the apparatus according to requirements for using the apparatus.

Figure 8:
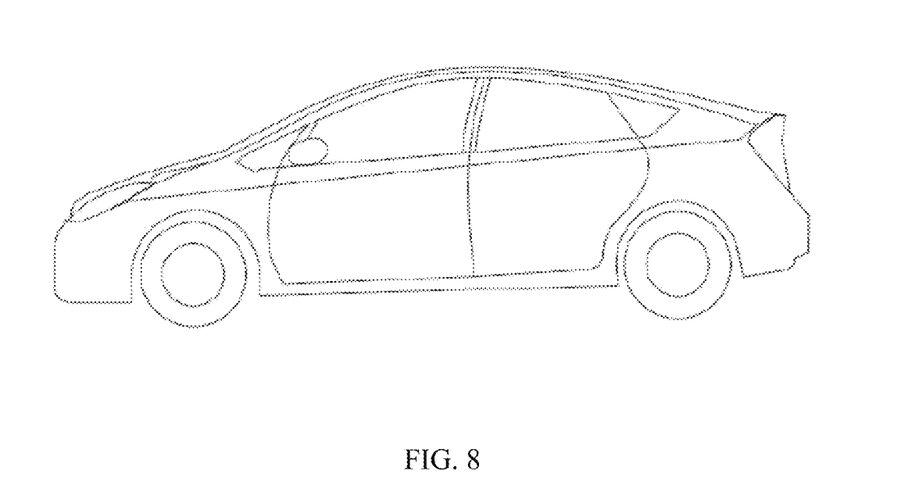
FIG. 8 is a schematic diagram of an embodiment of an apparatus using the battery in this disclosure as a power source.

FIG. 8 shows an apparatus used as an example. The apparatus is a full electric vehicle, a hybrid electric vehicle, a plug-in hybrid electric vehicle, or the like. To satisfy a requirement of the apparatus for a high rate and high energy density of a battery, a battery pack or a battery module may be used.

In another example, the apparatus may be a mobile phone, a tablet computer, a notebook computer, or the like. The apparatus usually needs to be light and thin, and the battery may be used as a power source.

The following further describes beneficial effects of this disclosure with reference to examples.

EXAMPLES

To make the invention objectives, technical solutions, and beneficial technical effects of this disclosure clearer, this disclosure is further described below in detail with reference to Examples. However, it should be understood that the Examples of this disclosure are merely intended to explain this disclosure, but not to limit this disclosure, and the Examples of this disclosure are not limited to the Examples given in this specification. In Examples in which specific test conditions or operating conditions are not specified, preparation is performed according to conventional conditions or according to conditions recommended by a material supplier.

I. Preparation of battery

Example 1

1. Preparation of organic support layer: The organic support layer could be prepared through a conventional casting method, unidirectional stretching, and bidirectional stretching, or could be commercially available.

2. Preparation of current collector:

The current collector in Example 1 was prepared in a vacuum evaporating method. Specifically, a 6 μm PET substrate film roll was put in a vacuum evaporating chamber, the vacuum evaporating chamber was evacuated to $2.5 \times 10^{-3}$ Pa, a high-purity aluminum wire was fed at a wire feeding speed of 300 mm/min to an evaporation boat heated to 800° C. to 2000° C. for melting and evaporation, high-purity oxygen (with purity of 99.99%) was also injected into the vacuum chamber at 300 mL/min, and evaporated Al and alumina obtained through reaction with oxygen were co-deposited on a surface of the organic support layer to form an aluminum-based conductive layer; and after evaporation was repeatedly performed about 20 times, an aluminum-based current collector having a coating of about 800 nm in thickness was obtained.

3. XPS measurement method for current collector:

A PHI quantera XPS tester was used, and a test was performed at room temperature of 23±2° C. and relative humidity greater than or equal to 65%. Before a test, a surface of the current collector was etched with an Ar ion etcher to remove a passivation layer on the surface, and etching parameters were 3 kV and 15 minutes. An etched current collector sample was put into the XPS tester for measurement. Data from 8 to 10 data points of a same sample was collected for data measurement accuracy and error analysis.

4. Preparation of electrode plate and battery:

(1) Preparation of Positive Electrode Plate

Lithium-nickel-cobalt-manganese ternary active substance $LiN_{10.8}Co_{0.1}Mn_{0.1}O_2$ (NCM811), conductive carbon black Super-P, and polyvinylidene fluoride (PVDF) as a binder at a weight ratio of 94:3:3 were fully stirred and evenly mixed in an N-methylpyrrolidone solvent, to obtain a positive electrode slurry. The positive electrode slurry was applied onto a positive electrode current collector, and subjected to processes such as drying, cold pressing, slitting, and cutting, to obtain the positive electrode plate. A compressed density of the positive electrode active material layer was 3.4 g/cm$^3$.

(2) Preparation of Negative Electrode Plate

Artificial graphite as a negative electrode active material, SBR as a binder, sodium carboxymethyl cellulose (CMC-Na) as a thickener, and conductive carbon black (Super P) were weighted at a weight ratio of 96.2:1.8:1.2:0.8, and the negative electrode active materials and deionized water were added into a mixing tank in a specific sequence for mixing, to prepare the negative electrode slurry. The negative electrode slurry was applied onto a negative electrode current collector (8 µm Cu foil), and subjected to processes such as drying, cold pressing, slitting, and cutting, to obtain the negative electrode plate. A compressed density of the negative electrode active material layer was 1.6 g/cm$^3$.

(3) Separator

APE film was selected as the separator.

(4) Preparation of Electrolyte

Ethylene carbonate (EC) and ethyl methyl carbonate (EMC) were mixed at a volume ratio of 3:7, and then a fully dried lithium salt $LiPF_6$ was dissolved in the mixed organic solvent at a proportion of 1 mol/L, to prepare the electrolyte.

(5) Preparation of Battery

A positive electrode plate, a separator, and a negative electrode plate were stacked in sequence and wound to obtain an electrode assembly, the electrode assembly was put in an outer package, the foregoing electrolyte was added, and processes such as packaging, standing, formation, and aging were performed to finally obtain the lithium-ion secondary battery in Example 1.

Example 2

A current collector in Example 2 was prepared in the vacuum evaporating method, with differences from Example 1 in that an oxygen feeding rate was 800 mL/min, a wire feeding speed was 200 mm/min, and evaporation was performed 30 times. Then, a battery electrode plate and a battery were prepared in a method similar to that in Example 1, but compositions and product parameters of the battery electrode plate were varied. For details about different product parameters, refer to Table 1.

Example 3

A current collector in Example 3 was prepared in the vacuum evaporating method, with differences from Example 1 in that gas injected was high-purity nitrogen (with purity of 99.99%), a gas flow rate was 600 mL/min, a wire feeding speed was 240 mm/min, and evaporation was performed 25 times. Then, a battery electrode plate and a battery were prepared in a method similar to that in Example 1. Specific parameters are given in Table 1.

Example 4

A current collector in Example 4 was prepared in the vacuum evaporating method, with differences from Example 1 in that gas injected was high-purity fluorine (with purity of 99.99%), a gas flow rate was 650 mL/min, a wire feeding speed was 270 mm/min, and evaporation was performed 22 times. Then, a battery electrode plate and a battery were prepared in a method similar to that in Example 1. Specific parameters are given in Table 1.

Example 5

A current collector in Example 5 was prepared in the same method as Example 2, and then, a battery electrode plate and a battery were prepared in a method similar to that in Example 1, but the battery capacity varied. Specific parameters are given in Table 1.

Examples 6 to 9 and Comparative Examples 1 to 4

Preparation methods of the current collectors, positive electrode plates, and secondary batteries in Examples 6 to 9 and the current collectors and secondary batteries in Comparative Examples 1 to 4 were similar to those in Example 3, but materials varied for the organic support layer. Specific parameters are given in Table 1 and Table 2.

Example 10

In Example 10, material and thickness of the organic support layer of the positive electrode current collector, material and thickness of the conductive layer, and preparation methods of the positive electrode plate and battery were the same as those in Example 3. A differences was that in the preparation process of the positive electrode current collector, after the conductive layer was obtained through vapor deposition, first protection layer treatment was added (specifically, a substrate was put into an oven filled with ozone gas for heat treatment, where an ozone flow rate was 1 L/min, oven temperature was 120° C., and heat treatment duration was 30 minutes).

Example 11

In Example 11, material and thickness of the organic support layer of the positive electrode current collector, material and thickness of the conductive layer, and preparation methods of the positive electrode plate and battery were the same as those in Example 3. A difference was that in the preparation process of the positive electrode current collector, after the conductive layer was obtained through vapor deposition, first protection layer treatment was added (specifically, a substrate was put into an oven filled with ozone gas for heat treatment, where an ozone flow rate was 1.5 L/min, oven temperature was 130° C., and heat treatment duration was 30 minutes).

Example 12

In Example 12, material and thickness of the organic support layer of the positive electrode current collector, material and thickness of the conductive layer, and preparation methods of the positive electrode plate and battery were the same as those in Example 3. A difference was that in the preparation process of the positive electrode current collector, after the conductive layer was obtained through vapor deposition, first protection layer treatment was added (specifically, a substrate was put into an oven filled with ozone gas for heat treatment, where an ozone flow rate was 2.0 L/min, oven temperature was 140° C., and heat treatment duration was 30 minutes).

Example 13

In Example 13, material and thickness of the organic support layer of the positive electrode current collector, material and thickness of the conductive layer, and preparation methods of the positive electrode plate and battery were the same as those in Example 3. A difference was that in the preparation process of the positive electrode current collector, after the conductive layer was obtained through vapor deposition, first protection layer treatment was added (specifically, a substrate was put into an oven filled with ozone gas for heat treatment, where an ozone flow rate was 3.0 L/min, oven temperature was 150° C., and heat treatment duration was 30 minutes).

II. Test Methods of Battery Performance Parameters (1) Rate Test

A lithium-ion battery was charged/discharged at 1C/1C at 25° C. Specifically, the lithium-ion battery was first charged to 4.2 V at a current of 1C, and then discharged to 2.8 V at a current of 1C, and a discharge capacity at 1C was recorded; and then the battery was charged/discharged at 2C/2C, a discharge capacity at 2C was recorded, and the discharge capacity at 2C was divided by the discharge capacity at 1C, to obtain a capacity retention rate at a rate of 2C.

(2) Nail Penetration Test:

After being fully charged, the battery was fastened, and a temperature sensing wire was attached to geometric centers of a nail-penetrated surface and a back of the battery to be penetrated by a nail, and connected to a multi-channel thermodetector; a steel nail with a 8 mm diameter was used to penetrate the battery at a speed of 25 mm/s at room temperature, and the steel nail was kept in the battery; and after penetration by the nail, the battery was observed, and a five-minute battery temperature tracking test was conducted, with the battery temperature at the fifth minute recorded.

III. Test Results of Examples and Comparative Examples

1. Parameters of positive electrode current collectors and electrical performance of batteries:

Table 1 shows specific parameters of the current collectors of this disclosure and electrical performance of corresponding battery cells in the examples and comparative examples.

TABLE 1

| Number | Organic support layer | | Aluminum-based conductive layer | | First peak intensity at 72.9 eV | Second peak intensity at 74.4 eV | Value of x | Cell capacity (Ah) | Capacity retention rate of cell at 2 C | Temperature rise of cell after nail penetration (° C.) |
| --- | --- | --- | --- | --- | --- | --- | --- | --- | --- | --- |
| | Material | Thickness (μm) | Material | Thickness (μm) | | | | | | |
| Example 1 | PET | 6 | Al/Al$_2$O$_3$ | 0.8 | 730 | 84 | 0.1 | 60 | 93% | 6.3 |
| Example 2 | PET | 6 | Al/Al$_2$O$_3$ | 0.8 | 682 | 818 | 1.2 | 60 | 90% | 2.8 |
| Example 3 | PET | 6 | Al/AlN | 0.8 | 869 | 696 | 0.8 | 60 | 91% | 4.8 |
| Example 4 | PET | 6 | Al/AlF$_3$ | 0.8 | 805 | 725 | 0.9 | 60 | 91% | 3.5 |
| Example 5 | PET | 6 | Al/Al$_2$O$_3$ | 0.8 | 682 | 818 | 1.2 | 300 | 89% | 5.5 |
| Comparative Example 1 | — | — | Al | 12 | 820 | 0 | 0 | 60 | 95% | 330 |
| Comparative Example 2 | PET | 6 | Al/Al$_2$O$_3$ | 0.8 | 219 | 768 | 3.5 | 60 | 75% | 2.4 |
| Comparative Example 3 | PET | 6 | Al/Al$_2$O$_3$ | 0.8 | 759 | 0 | 0 | 60 | 94% | 23 |
| Comparative Example 4 | PET | 6 | Al/Al$_2$O$_3$ | 0.8 | 759 | 0 | 0 | 300 | 93% | 450 |

It can be seen from results in Table 1 that safety performance of the battery cell (Examples 1 to 4) prepared by using the current collector in this disclosure was significantly improved compared with that of a conventional Al foil battery cell (Comparative Example 1) with a same capacity, the battery cell could pass the nail penetration test, the temperature rise could be controlled within 10° C., and rate performance of the battery cell was comparable to that of the conventional Al foil battery cell. In addition, it can be seen that a material of the aluminum-based conductive layer in this disclosure had no obvious impact on electrical performance and the safety performance of the battery cell.

It can be seen from comparison of the Examples with Comparative Examples 2 to 4 that a value of a key characteristic x of the aluminum-based conductive layer required in this disclosure had significant impact on the electrical performance and safety performance of the battery cell: When x>3.0 (Comparative Example 2), rate performance of a sample battery cell was significantly decreased, and conductivity of the aluminum-based conductive layer was significantly affected; when x=0, a corresponding sample battery (60 Ah, Comparative Example 3) with a small capacity could also pass the nail penetration test. However, temperature rise of the battery cell was already obvious; and when the capacity of the battery cell became larger, the sample battery cell (300 Ah, Comparative Example 4) could no longer pass the nail penetration test; or when 0<x≤3.0 as required in this disclosure, a corresponding sample battery cell (300 Ah, Example 5) with a large capacity could also pass the nail penetration test, and the battery cell had no obvious temperature rise.

Figure 9:
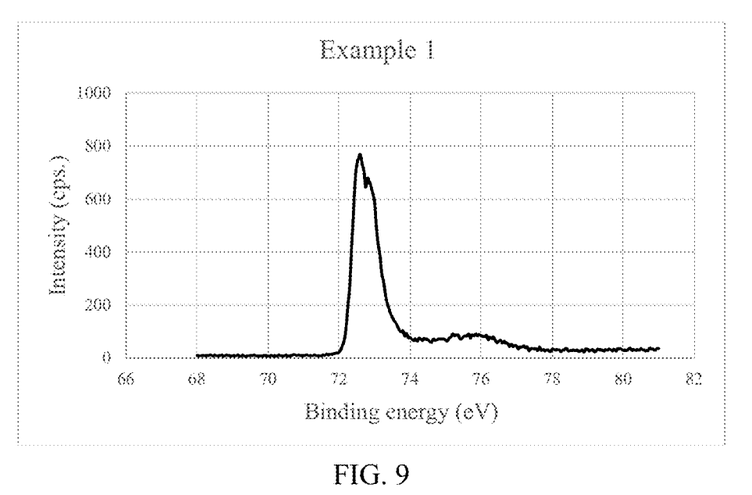
FIG. 9 is an XPS spectrogram of a positive electrode current collector in Example 1.
Figure 10:
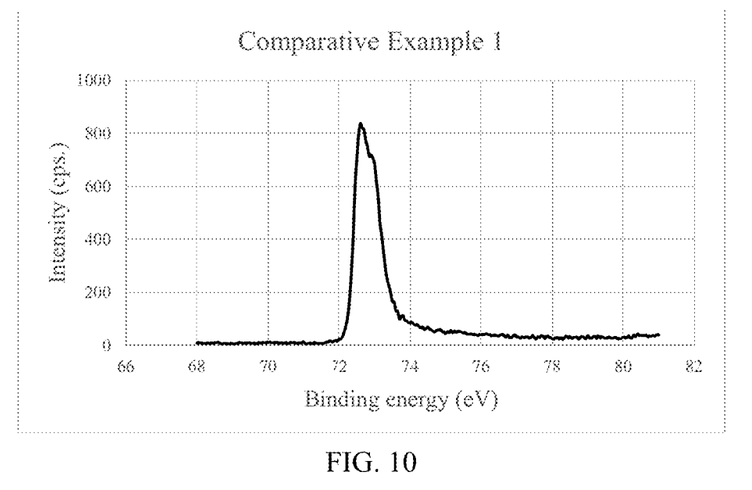
FIG. 10 is an XPS spectrogram of a positive electrode current collector in Comparative Example 1.
Figure 13:
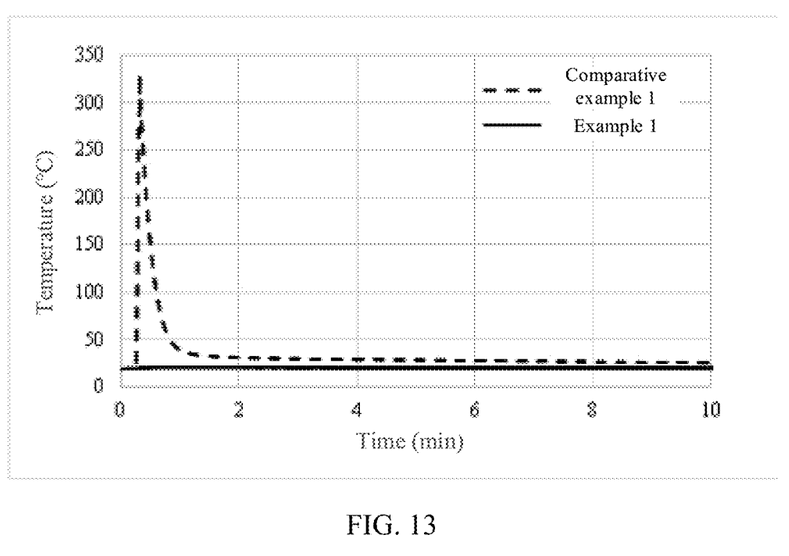
FIG. 13 shows temperature change curves after a nail penetration test of the batteries in Example 1 and Comparative Example 1.

FIG. 9 and FIG. 10 are XPS spectrograms of a positive electrode current collector in Example 1 and Comparative Example 1. In addition, FIG. 13 shows time-temperature curves of the batteries in Example 1 and Comparative Example 1.

2. Mechanical nail penetration test and durability test of current collector

To better illustrate an action mechanism of the current collector in this disclosure in improving the nail penetration performance of the battery cell, the current collector in this disclosure (Example 1) and the conventional aluminum foil (Comparative Example 1) were mechanically penetrated by using a nail and their surface microscopic morphologies were observed. A steel nail with a diameter of 8 mm was used for the mechanical nail penetration, and penetrated through 25 layers of neatly stacked and fastened current collectors at a speed of 25 mm/s, and a location of a penetration opening at a 10th layer was selected for microscopic morphology observation under a scanning electron microscope. Morphologies of penetration openings of the current collector in this disclosure and the conventional aluminum foil current collector were shown in FIG. 11 and FIG. 12 separately.

Figure 11:
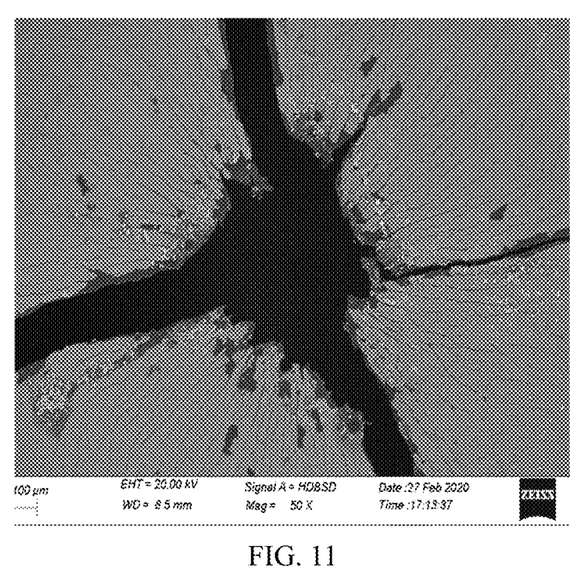
FIG. 11 is a diagram of surface microscopic topography of a current collector that is mechanically penetrated by a nail, in Example 1 of this disclosure.
Figure 12:
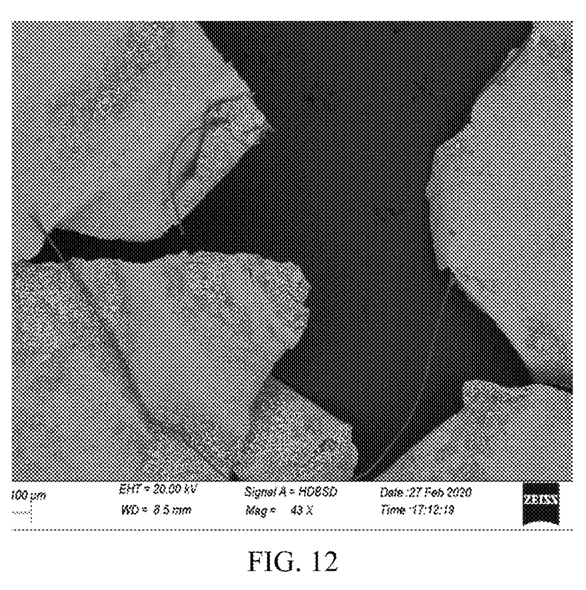
FIG. 12 is a diagram of surface microscopic topography of conventional aluminum foil (the current collector in Comparative Example 1) that is mechanically penetrated by a nail.

As shown in FIG. 11 and FIG. 12, after the nail penetration, compared with a surface of the conventional aluminum foil, the current collector in this disclosure showed obvious cracking morphology around the penetration opening, which indicated that the aluminum-based conductive layer was obviously damaged after the nail penetration, thereby further hindering current conduction around the penetration opening and forming local "point break". This helped avoid the internal short circuit occurring at the nail penetration opening between the positive and negative electrodes when the battery cell was damaged after the nail penetration, and further avoided resulting thermal runaway, thereby improving the safety performance of the battery cell.

When the penetration displacement of the support layer material was lower, deformation of the current collector, a corresponding electrode plate, and the battery under mechanical damage was also smaller, a probability of thermal runaway caused by the short circuit of the battery was also lower, so that the battery was safer.

Penetration displacement of a support layer material was not only related to chemical compositions of the material, but also closely related to preparation parameters (heat treatment temperature, duration, a film stretching method, a stretch ratio, and the like) of the material during processing.

The penetration displacement test method was as follows:

A Gotech tensile machine was used for the penetration displacement test. A to-be-tested sample was fastened on the Gotech tensile machine with a ring clamp, a horizontal plane of the sample was perpendicular to a Z-axis moving shaft of the tensile machine, a ring area was 12.56 cm² (with a diameter of 4 cm), a steel nail with a cross-section area of 1 mm² (an end face was hemispherical) penetrated the sample along the Z axis of the tensile machine at a speed of 50 mm/min, and displacement of the steel nail from a time when the steel nail came into contact with the sample to a time when the sample was penetrated through was measured and recorded. The displacement was the penetration displacement of the sample.

Current collector durability test method was as follows:

A substrate was punched into 10×10 cm² plate samples, immersed in 100 mL of electrolyte (a $LiPF_6$ concentration was 1 mol/L, and a volume ratio of EC/EMC was 7:3) added with 0.1 mm of water, sealed, and put in an oven at 70° C. for 48 hours of storage. After the storage, the substrate was taken out, washed with a DMC solvent, and dried. Integrity of a surface coating of the substrate was observed and an area of the surface coating was measured. Electrolyte durability of the substrate was calculated by using the following formula: electrolyte durability=coating area after immersion and storage (cm²)/initial area of substrate coating (100 cm²)×100.

Results of mechanical nail penetration test and durability test of current collectors are given in Table 2 and Table 3.

TABLE 2

| Number | Organic support layer | | | Aluminum-based conductive layer | | | Capacity | | Temperature rise of cell after nail penetration (° C.) |
|---|---|---|---|---|---|---|---|---|---|
| | Material | Thickness (μm) | Penetration displacement (mm) | Material | Thickness (μm) | Value of x | Cell capacity (Ah) | retention rate of cell at 2 C | |
| Example 6 | PET-1 | 6 | 3.8 | Al/$Al_2O_3$ | 0.8 μm | 0.8 | 60 Ah | 91% | 5.3 |
| Example 7 | PET-2 | 6 | 3.2 | Al/$Al_2O_3$ | 0.8 μm | 0.8 | 60 Ah | 91% | 4.8 |
| Example 8 | PP | 6 | 4.7 | Al/$Al_2O_3$ | 0.8 μm | 0.8 | 60 Ah | 91% | 6.7 |
| Example 9 | PE | 6 | 6.4 | Al/$Al_2O_3$ | 0.8 μm | 0.8 | 60 Ah | 91% | 36 |

It can be seen from the foregoing test data that when the penetration displacement of the current collector was less than or equal to 5 mm, temperature rise of the battery cell after the nail penetration was smaller, and safety of the battery was better.

TABLE 3

| Number | Value of x | Third peak intensity | Fourth peak intensity | Value of y | Cell capacity (Ah) | Electrolyte durability | Temperature rise of cell after nail penetration (° C.) |
|---|---|---|---|---|---|---|---|
| Example 10 | 0.8 | 527 | 853 | 1.6 | 60 | 75 | 4.2 |
| Example 11 | 0.8 | 309 | 864 | 2.8 | 60 | 88 | 3.8 |
| Example 12 | 0.8 | 261 | 835 | 3.2 | 60 | 94 | 3.3 |
| Example 13 | 0.8 | 221 | 880 | 4.0 | 60 | 98 | 2.6 |
| Example 3 | 0.8 | 570 | 809 | 1.4 | 60 | 53 | 4.8 |

In Examples 10 to 13, materials and thicknesses of organic support layers of the positive electrode current collectors, materials and thicknesses of conductive layers, and preparation methods of positive electrode plates and the batteries were all the same. A difference was that in the preparation process of the positive electrode current collector, after the conductive layer was obtained through vapor deposition, first protection layer treatment was added. It can be seen from Table 3 that when a value of y of a first protection layer on the surface of the conductive layer was between 1.5 and 4.0, mechanical strength of the conductive layer could be further improved, and the first protection layer and the conductive layer were also more firmly bonded, so that durability of the current collector with the composite structure was significantly improved.

Although this disclosure is disclosed above with preferred embodiments, they are not intended to limit the claims. Any person skilled in the art can make several possible changes and modifications without departing from the concept of this disclosure. Therefore, the protection scope of this disclosure shall be subject to the scope defined by the claims of this disclosure.

What is claimed is:

1. A positive electrode current collector, comprising an organic support layer and an aluminum-based conductive layer disposed on at least one surface of the organic support layer, wherein the aluminum-based conductive layer contains aluminum (Al) and at least one modifying element selected from the group consisting of oxygen (O), nitrogen (N), fluorine (F), boron (B), sulfur (S), and phosphorus (P), wherein an X-ray photoelectron spectroscopy (XPS) spectrogram of the aluminum-based conductive layer with a surface passivation layer removed through etching has at least a first peak in a range of 70 eV to 73.5 eV and a second peak in a range of 73.5 eV to 78 eV, wherein a ratio x of peak intensity of the second peak to that of the first peak satisfies 0<x≤3.0.

2. The positive electrode current collector according to claim 1, wherein the ratio x of the peak intensity of the second peak to that of the first peak satisfies 0.1≤x≤1.5.

3. The positive electrode current collector according to claim 1, wherein a peak position of the first peak is in a range of 72.9 eV±0.6 eV, 72.9 eV±0.5 eV, 72.9 eV±0.4 eV, 72.9 eV±0.3 eV, 72.9 eV±0.2 eV, or 72.9 eV±0.1 eV; or
a peak position of the second peak is in a range of 74.4 eV±0.6 eV, 74.4 eV±0.5 eV, 74.4 eV±0.4 eV, 74.4 eV±0.3 eV, 74.4 eV±0.2 eV, or 74.4 eV±0.1 eV.

4. The positive electrode current collector according to claim 1, wherein a thickness of the aluminum-based conductive layer is D1, and D1 satisfies 0.1 μm≤D1≤5 μm.

5. The positive electrode current collector according to claim 1, wherein an etching depth h of the aluminum-based conductive layer and a thickness D1 of the aluminum-based conductive layer satisfy 0.1×D1≤h≤0.5×D1.

6. The positive electrode current collector according to claim 1, wherein the modifying element in the aluminum-based conductive layer is selected from oxygen (O), nitrogen (N), and fluorine (F).

7. The positive electrode current collector according to claim 1, wherein an organic support layer material is at least one selected from the group consisting of polyurethane, polyamide, polyterephthalate, polyimide, polyethylene, polypropylene, polystyrene, polyvinyl chloride, acrylonitrile-butadiene-styrene copolymer, polybutylene late, poly(p-phenylene terephthalamide), poly(p-phenylene ether), polyoxymethylene, epoxy resin, phenolic resin, polytetrafluoroethylene, polyvinylidene fluoride, silicone rubber, polycarbonate, and polyphenylene sulfide.

8. The positive electrode current collector according to claim 7, wherein penetration displacement of the organic support layer material is less than or equal to 5 mm.

9. The positive electrode current collector according to claim 1, wherein an X-ray photoelectron spectroscopy (XPS) spectrogram of a surface of the aluminum-based conductive layer has at least a third peak falling in a range of 70 eV to 73.5 eV and a fourth peak falling in a range of 73.5 eV to 78 eV, and a ratio y of peak intensity of the fourth peak to that of the third peak satisfies 1.5<y≤4.0.

10. The positive electrode current collector according to claim 1, wherein the aluminum-based conductive layer is formed on the support layer through at least one of mechanical roll-in, bonding, vapor deposition, and electroless plating.

11. A positive electrode plate, comprising the positive electrode current collector according to claim 1 and an electrode active material layer formed on a surface of the positive electrode current collector.

12. A battery, comprising a positive electrode plate, a separator, and a negative electrode plate, wherein the positive electrode plate is the positive electrode plate according to claim 11.

13. A battery module, comprising the battery according to claim 12.

14. A battery pack, comprising the battery according to claim 12.

* * * * *